No. 687,702. Patented Nov. 26, 1901.
W. F. STIMPSON.
SCALE.
(Application filed May 6, 1899.)
(No Model.)
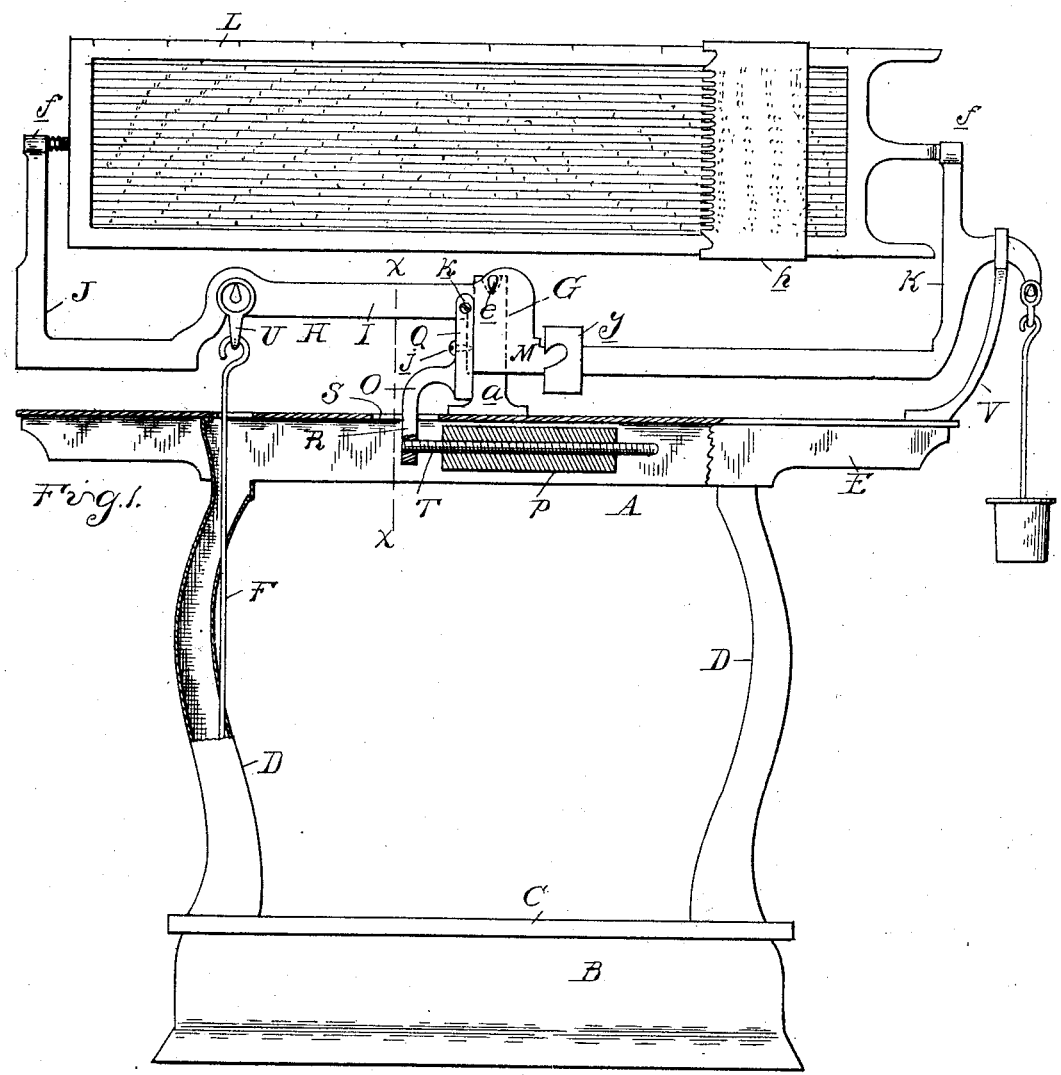
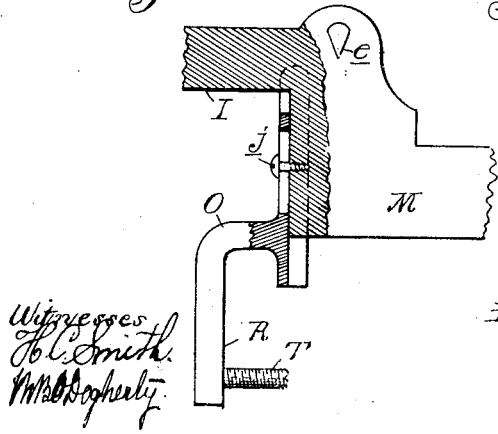
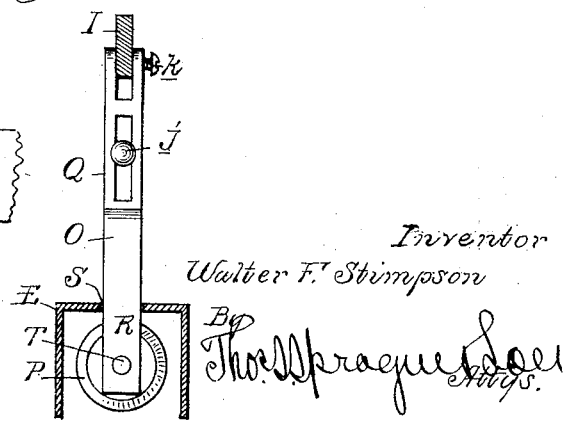
Inventor
Walter F. Stimpson

UNITED STATES PATENT OFFICE.

WALTER F. STIMPSON, OF DETROIT, MICHIGAN.

SCALE.

SPECIFICATION forming part of Letters Patent No. 687,702, dated November 26, 1901.

Application filed May 6, 1899. Serial No. 715,847. (No model.)

*To all whom it may concern:*

Be it known that I, WALTER F. STIMPSON, a citizen of the United States, residing at Detroit, in the county of Wayne and State of Michigan, have invented certain new and useful Improvements in Scales, of which the following is a specification, reference being had therein to the accompanying drawings.

The invention has general reference to computing-scales, and relates particularly to a counterbalance-weight for the scale-beam.

One of the objects of my invention is to so construct and arrange with respect to the several scale parts a weight of the type referred to that it may be made of considerable less size than the weights heretofore employed; and a further object of the invention is to so locate the weight that it will be entirely concealed from view, whereby a more finished appearance will be given to the scale and a more compact structure will be obtained.

To attain the objects thus enumerated, I so construct the scale that the weight will be arranged below the scale-beam, its weighing and price member, and likewise below the usual scale shelf or cap, whereby the beam is brought in close proximity to said shelf with its center of gravity at the lowest point, while the shelf or cap is utilized as a housing to conceal and protect the weight.

The invention therefore consists in the novel construction and arrangement of the counterbalance-weight and the peculiar arrangement and combination of the various other parts of the scale, as will be more fully hereinafter described, and shown in the drawings, in which—

Figure 1 is a sectional elevation of a scale embodying my invention. Fig. 2 is a vertical central section through a portion of the scale-beam, partly in elevation; and Fig. 3 is a section taken on line $x\ x$ of Fig. 1.

The reference-letter A designates a counter-scale of any approved type, comprising in its construction the usual base B, the platform C, and the shelf-frame D.

E designates the usual scale-shelf, supported by the frame, and F is the usual rod connecting the scale-levers (not shown) with the beam. Upon the scale-shelf is mounted a fulcrum-stand G, comprising spaced uprights $a$, having grooved upper ends adapted to receive the knife-edge bearing $e$ of the scale-beam H. The beam last referred to may be, if desired, and preferably is, a tare-beam, comprising in its construction a transverse member I, substantially parallel with the shelf, and upward-extending arms J and K, each provided at its upper end with a bearing $f$, in which is pivoted for rotary movement the weighing and price member L.

$g$ designates a poise for the tare, and $h$ is the weighing and price poise.

The member I of the scale-beam is formed with an offset or shoulder M, which extends downwardly between the members of the fulcrum-standard, and upon this shoulder is secured a bracket O, which carries the counterbalance-weight P. More particularly the construction of the bracket and weight is as follows: The bracket comprises a slotted member Q, which is secured to the shoulder M by means of a screw $j$ and to the beam by a screw-bolt $k$. The bracket at its lower end terminates in a downwardly-extending arm R, which projects through an opening S in the shelf, and extending laterally from said arm is a threaded stem T, upon which the weight P is adjustably secured.

The reference-letter U designates a link connected to the scale-beam, to which is attached the upper end of the rod F, and V designates a stop secured to the shelf, which limits the upward movement of said beam.

In assembling the parts the weight-carrying bracket is adjusted vertically until the beam is evenly balanced and is then fixedly secured to the said beam in the manner before set forth. Further adjustment to balance the beam is effected in the usual manner by adjusting laterally the counterbalance-weight P.

From the foregoing description of my invention it will be readily observed that by arranging the counterbalance-weight in the manner set forth—viz., below the beam and the shelf—the beam is brought in close proximity to said shelf, and the center of gravity of said beam is at the lowest point. Moreover, the weight by being arranged beneath the scale-cap, while being protected by the latter from injury, is concealed from view, whereby a more finished appearance is given to the scale.

What I claim as my invention is—

1. The combination in a counter-scale of the shelf or cap, a fulcrum-stand thereon, a beam fulcrumed on said stand, and extending substantially parallel with the shelf, upwardly-extended arms on the beam, a computing and weighing member carried in said arms, of an arm connected to the beam and extending through an aperture in the cap or shelf, and the counterbalance weight or ball adjustably secured on said arm.

2. In a weighing-scale, in combination with a fulcrum-support, the poised beam fulcrumed thereon, having an arm extending rigidly from the beam to a point remotely below the horizontal plane of the fulcrum at one side of the vertical plane of the same; and a correcting-poise carried by said arm at such remote point, and on the side thereof toward the said fulcrum; whereby the poise is brought underneath the fulcrum; said poise being adjustable horizontally within a range extending a short distance both sides of the vertical plane of the fulcrum.

3. In a weighing-scale, in combination with the fulcrum-supporting shelf, the poised beam, fulcrumed above the shelf and having an arm extending rigidly downward through the shelf, the shelf being apertured for that purpose and a correcting-poise carried by such downwardly-extending arm, such poise being located underneath the fulcrum and being horizontally adjustable on said arm.

4. In a weighing-scale, in combination with the fulcrum-supports and the shelf on which such supports are mounted, the beam fulcrumed on such supports and having two rigid arms extending upwardly at opposite sides of the fulcrum, and a rigid arm extending downwardly near the fulcrum to a point below the shelf; a computing member carried on the upwardly-extending arms and extending past the fulcrum; a correcting-poise carried on the downwardly-extending arm and located underneath the fulcrum and horizontally adjustable longitudinally with respect to the beam.

5. In a weight and value indicating scale, a poised beam having a value-computing-chart member supported by the beam and located above the same; the beam having an arm extending rigidly from it downward to a point remotely below the horizontal plane of the fulcrum and one side of the vertical plane of the same; and a correcting-poise carried by such arm at such remote point at the side thereof toward the vertical plane of the fulcrum, and horizontally adjustable a short distance either way from said vertical plane.

In testimony whereof I affix my signature in presence of two witnesses.

WALTER F. STIMPSON.

Witnesses:
   M. B. O'DOGHERTY,
   H. C. SMITH.